May 24, 1966  T. A. WIDDRINGTON  3,252,349
GEAR DRIVE MECHANISM
Filed Sept. 23, 1963  5 Sheets-Sheet 2

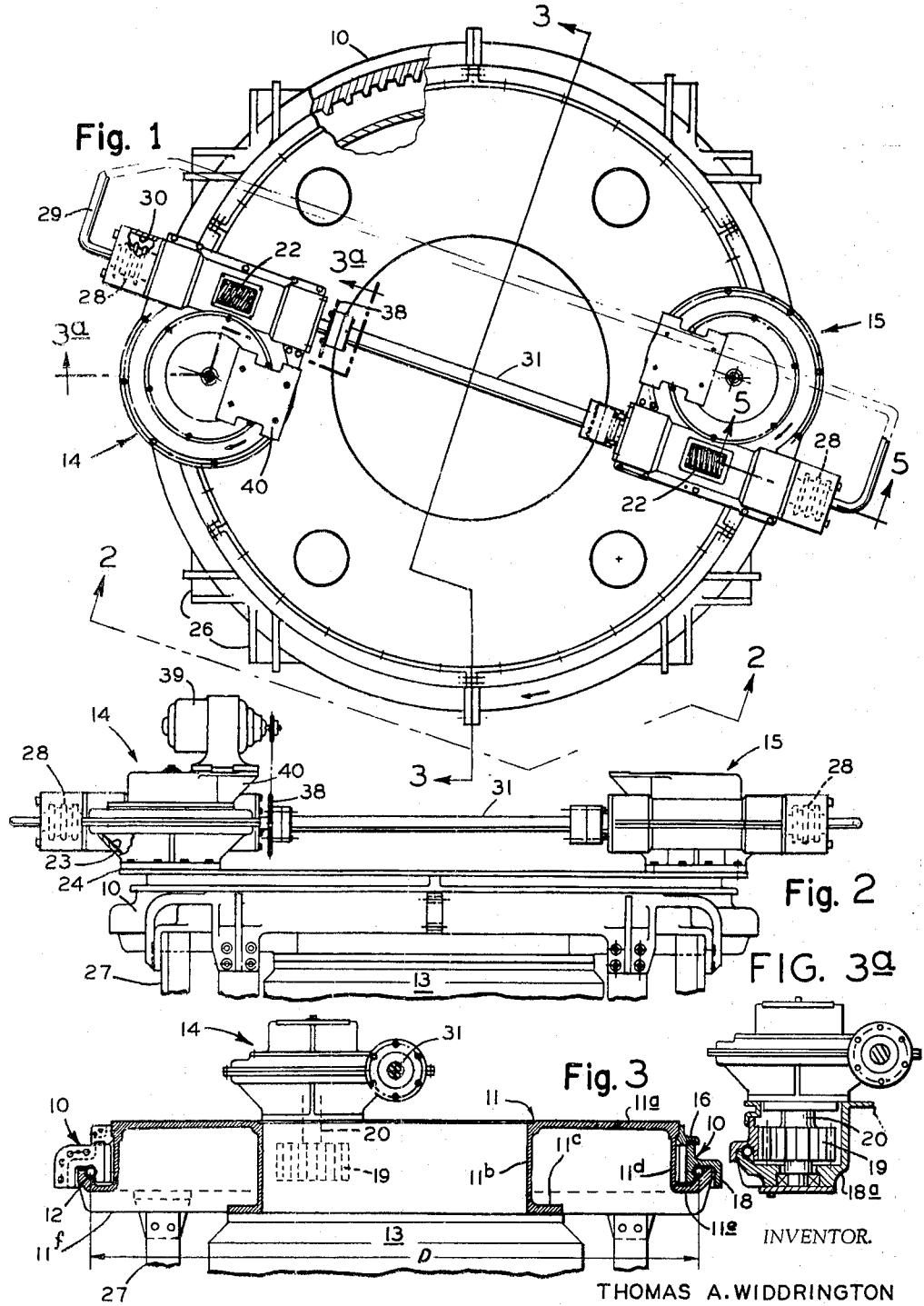

INVENTOR.
THOMAS A. WIDDRINGTON
BY
Theodore M. Jablon
ATTORNEY.

May 24, 1966 T. A. WIDDRINGTON 3,252,349
GEAR DRIVE MECHANISM
Filed Sept. 23, 1963 5 Sheets-Sheet 3

INVENTOR.
THOMAS A. WIDDRINGTON
BY
*Theodore M. Jablon*
ATTORNEY.

May 24, 1966　　　T. A. WIDDRINGTON　　　3,252,349
GEAR DRIVE MECHANISM
Filed Sept. 23, 1963　　　5 Sheets-Sheet 4
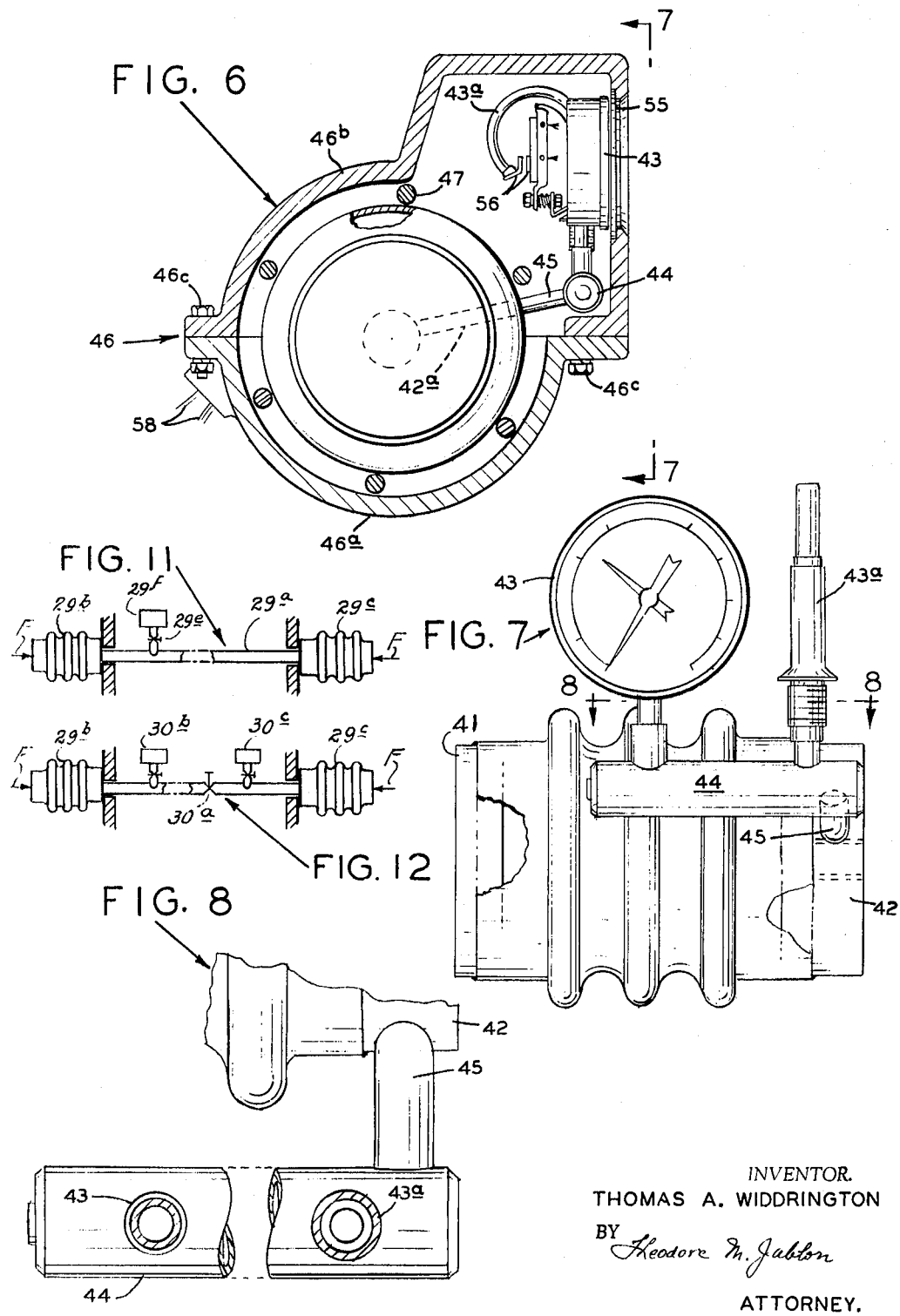
INVENTOR.
THOMAS A. WIDDRINGTON
BY Theodore M. Jablon
ATTORNEY.

May 24, 1966 T. A. WIDDRINGTON 3,252,349
GEAR DRIVE MECHANISM
Filed Sept. 23, 1963 5 Sheets-Sheet 5
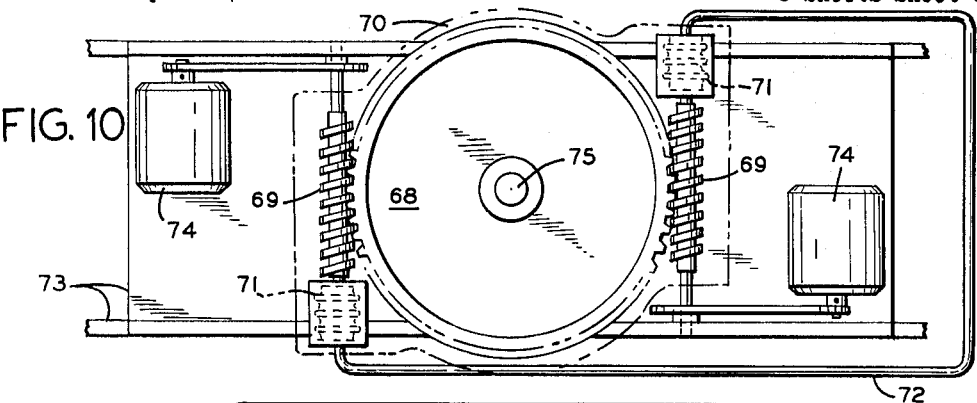
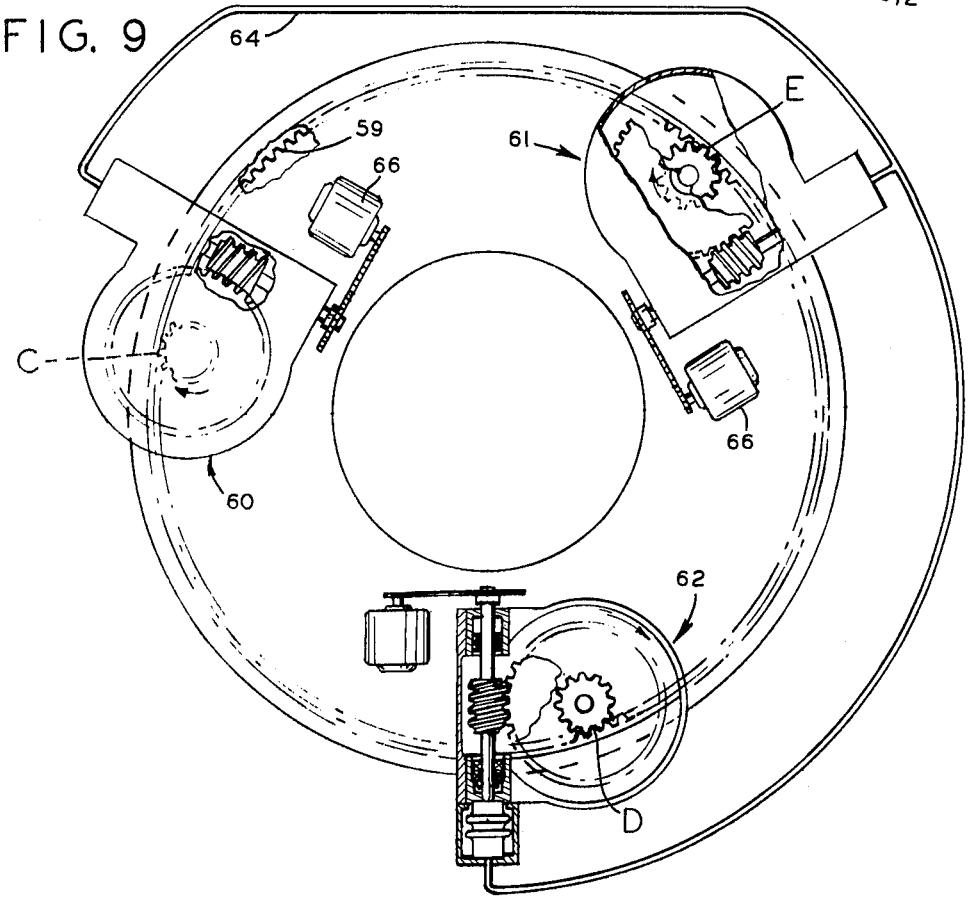
INVENTOR.
THOMAS A. WIDDRINGTON
BY
Theodore M. Jablon
ATTORNEY.

United States Patent Office 3,252,349
Patented May 24, 1966

3,252,349
GEAR DRIVE MECHANISM
Thomas A. Widdrington, Stamford, Conn., assignor to Dorr-Oliver Incorporated, Stamford, Conn., a corporation of Delaware
Filed Sept. 23, 1963, Ser. No. 310,542
22 Claims. (Cl. 74—427)

This invention relates to drive mechanism, and more particularly to gear drive mechanism wherein a balanced drive torque is to be imparted to a gear which is to be rotated against a torque resistance.

It is among the objects to provide drive mechanism wherein equal interbalanced shares of the drive torque are to be applied to a plurality of points spaced along the pitch diameter of the gear, and which is simple and compact as well as accurate and responsive in effecting a uniformly balanced drive torque application, and also highly flexible in regard to the number and disposition of the respective points of torque application.

In order that these objects may be attained, individual drive units are provided at the respective points of torque application, each drive unit comprising worm drive means operatively interconnected by way of torque balancing means, whereby the axial thrust reactions of the respective worm drive shafts are interbalanced when under load. As a result, each drive unit applies to the gear the same amount of torque, when suitable drive power is imparted to these units.

According to the invention, torque balancing means are provided in that each worm drive shaft has a thrust bearing unit for absorbing the thrust reaction of the worm drive shaft, the thrust bearing unit being mounted so as to allow for axial displacement thereof in the worm drive housing, although secured against rotation. A yieldably constructed hydraulic pressure chamber unit is cooperatively associated with the movable thrust bearing unit so as to be subjected to the thrust reaction force of the associated worm. Hydraulic pressure equalizing conduit means are provided to interconnect the respective hydraulic pressure chamber units with one another so as to constitute therewith a fluid-filled hydraulic pressure system, hydraulically interbalancing the respective worm thrust reactions, and providing a balanced drive torque for the gear, as the pressure chambers are yieldable by deformation.

Features of the invention are found in the construction and arrangement of the torque balancing means, and of components thereof.

In one embodiment of the invention a spur gear is driven by a pair of drive pinion units arranged opposite each other in meshing engagement with the gear. In each drive unit a worm drive rotates each pinion. The worm shaft members are hydraulically interbalanced, while an axially floating shaft member or the like interconnects the worm shaft members so they will rotate together. This arrangement allows for axial displacement of the worm shaft members relative to one another in providing torque equalization, when driving power is applied to this shaft assembly.

In other embodiments of the invention the drive units are individually motorized.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

The invention itself, however, both as to the construction and its method of operation, together with additional objects and advantages thereof, will be best understood from the following description of specific embodiments when read in connection with the accompanying drawings, in which:

FIG. 1 is a top view of one embodiment of the drive mechanism with torque balancing mechanism including the floating shaft assembly;

FIG. 2 is a side view of the drive mechanism taken on line 2—2 of FIG. 1;

FIG. 3 is a vertical sectional view of the drive mechanism taken on line 3—3 of FIG. 1;

FIG. 3a is a detail part sectional view of one of the drive units, taken on line 3a—3a of FIG. 1;

FIG. 6 is a vertical sectional view of the torque balancing devices taken on line 6—6 of FIG. 5;

FIG. 7 is a detail side view of the hydraulic pressure chamber unit of FIG. 5 detached from the mechanism;

FIG. 8 is an enlarged detail of the portion of the pressure chamber unit taken on line 8—8 of FIG. 7;

FIGS. 9 and 10 are respectively different embodiments of the invention featuring individually motorized drive units for the gear.

FIGS. 11 and 12 show different arrangements of the fluid pressure responsive means.

From the various embodiments herein illustrating and exemplifying the invention, it can be seen that the balanced torque is applicable to the gear by means of a plurality of drive units acting simultaneously at respective points of torque application, irrespective of the type of gear, which may be an internally toothed spur gear or an externally toothed spur gear, or it may be a worm gear engaged by a plurality of driving worms.

Figure 4:
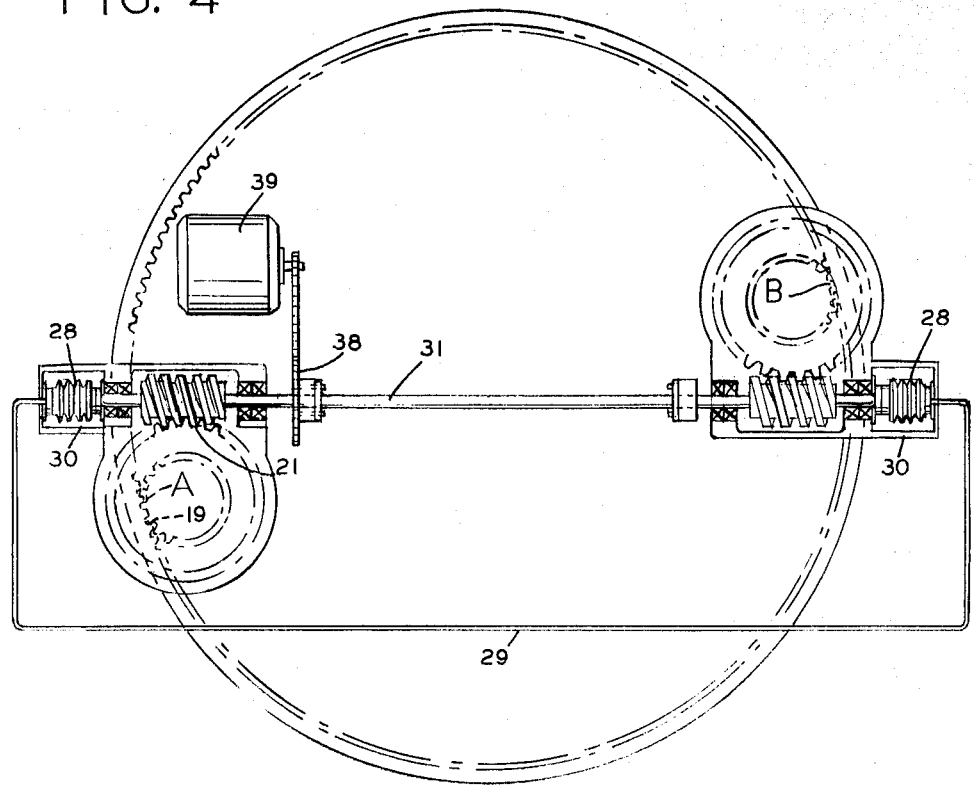
FIG. 4 is a schematic top view of the drive mechanism shown in FIGS. 1 to 3, more fully exposing the torque balancing devices comprising the hydraulic pressure chamber unit.

In the embodiment of FIGS. 1 to 4a, drive torque is applied to an internally toothed spur gear at the two points A and B, located opposite each other at respective diametrically opposed points of the pitch diameter of the gear, and shown more clearly in the schematic version of this mechanism in FIG. 4.

The mechanism itself comprises an internally toothed spur gear 10 rotatable upon base frame 11 about a vertical axis by means of an annular ball bearing construction 12 further designated by the diameter D. The base frame 11 in turn is securely supported by a foundation 13. Gear drive units 14 and 15 are mounted on the base frame 11 so that each may apply its share of the drive torque at points A and B respectively to the gear.

The base frame 11 in this example is an annular platform structure comprising a horizontal annular portion 11a, a cylindrical portion 11b extending downwardly from the inner periphery of the annular portion, and terminating in a bottom flange 11c whereby the structure is anchored to the foundation 13. From the outer periphery of the annular portion 11a extends downwardly a skirt portion 11d terminating at the bottom in an outwardly directed shelf or trough portion 11e accommodating the internally toothed spur gear 10 as well as the ball bearing construction 12. A pool of lubricating oil is maintainable in the trough. A ring member 16 surrounds the outer periphery of the annular platform portion, serving as a closure element by sealingly engaging the top of the rim portion of the gear. This sealing member together with the outwardly overhanging rim portion 18 of the gear protects the bearing as well as the inwardly facing teeth of the gear, and thus also the oil bath maintainable in the annular trough.

The base frame 11 is further formed with two recesses or pockets 18a each of which accommodates a drive pinion 19 of the respective drive units 14 and 15, engaging the internal gear at the aforementioned points A and B. In each of these drive units, the pinion 19, through a common shaft 20, is connected to a worm wheel 21 and driven by a worm shaft member 22 in a worm drive housing 23. This housing has a bottom flange 24 whereby it is bolted down upon the annular platform portion 11a. The base frame 11 has radial ribs 11f.

The internally toothed gear 10 is rotatable against a torque resistance indicated by portions 26 formed on the gear member and having structural parts 27 connected thereto.

According to the invention, the worm shaft members 22 of the two drive units are mounted in their respective housings so as to be axially displaceable to a slight degree and sufficient to allow them to move coaxially relative to each other for balancing the axial reaction thrusts of the worm shaft members one against the other through torque balancing devices presently to be described.

The general arrangement and function of the torque balancing means, although indicated in FIG. 1, will be more clearly understood from the schematic version thereof in FIG. 4.

In a preferred embodiment as shown the torque balancing means of this invention comprise a closed and self-contained hydraulic pressure system filled with a substantially non-compressible hydraulic liquid such as oil, having yieldable pressure chamber units 28 exposed to the thrust reaction of the respective worm shaft members 22 of the drive units, and a pressure equalizing pipe or conduit 29 hydraulically interconnecting the pressure chamber units. Each of the pressure chamber units is axially yieldable by deformation, and is preferably bellows-shaped and preferably arranged coaxial with the associated worm shaft member 22. Each pressure chamber unit receives the thrust reaction from the associated worm shaft member through a thrust bearing unit at the inner end, while the opposite or outer end of the unit engages non-yieldable abutment means provided by a casing member 30 or the like surrounding the pressure chamber unit and connected to the adjacent end portion of the worm gear housing.

The two worm shaft members while being driven simultaneously are capable, by slight axial shift, to coaxially adjust themselves relative to one another, thus to allow for torque equalization between the drive units through the medium of the hydraulic pressure system incident to axially directed deformation of the pressure chamber units.

In this embodiment, simultaneous drive is imparted to the worm shaft members 22 through a shaft assembly wherein an axially floating shaft member 31 interconnects the inner ends of the worm shaft members 22 in driving relationship therewith, while leaving them free to adjust themselves axially relative to one another when driving power is applied to the floating shaft member 31.

Figure 4A:
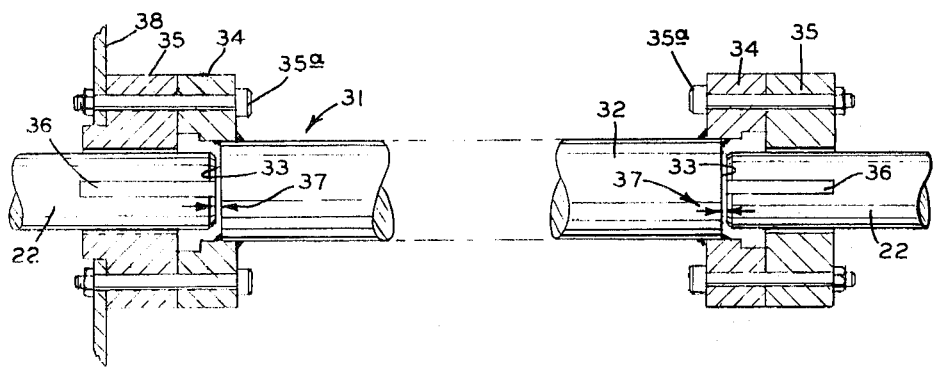
FIG. 4a is a greatly enlarged detail view of the floating shaft assembly derived from FIGS. 1 to 3.

Such a shaft assembly is clearly shown in the enlarged detail view thereof in FIG. 4a. Accordingly, the axially floating shaft member 31 comprises a shaft portion 32 having end faces 33. A terminal flange member 34 is fitted around each end of the shaft portion and is welded in place thereon in a position whereby the end face 33 of the shaft portion is recessed from the outer end face of the flange member 34. Each terminal flange member 34 has a companion flange or ring member 35 coaxially connected thereto face to face by means of bolt connections 35a. Each companion flange in turn fits loosely or slidably around the adjacent end of a respective adjoining worm shaft member 22, and has torque transmitting connection therewith as indicated by a spline or key 36 or the like. The shaft portion 32 is shown to be of somewhat larger diameter than that of the associated worm shaft members, and clearances 37 are provided for between the ends of the shaft portion 32 and the associated worm shaft members, the spline or key connections having sufficient tolerance to allow for the aforementioned axial shift incident to torque equalization.

Driving power is imparted to the floating shaft member 31 and thus to the worm shaft members 22 simultaneously, through a sprocket gear 38 or the like fastened to the outer face of one of the companion flanges 35, utilizing the bolt connections 35a for the connection. A motor 39 schematically indicated in FIG. 4, is preferably mounted on a bracket portion 40 atop the worm gear housing 24 (see FIGS. 1 to 3), providing the driving power for the sprocket gear.

According to the greatly enlarged details in FIGS. 5 to 8, the pressure chamber unit corresponding to those indicated schematically in FIG. 4, is here designated as 28'. In the preferred embodiment shown this pressure unit comprises a thin-walled hollow body portion having the outward appearance of a body of rotation, formed with substantially cylindrical end portions 28a and with peripheral corrugations 28c intermediate the end portions. This thin-walled corrugated member may consist of thin gauge springy metal having sufficient strength as well as resiliency to make it axially yieldable but radially substantially non-yieldable against internal fluid pressure. To contain such pressure, end closure members preferably in the form of plug members 41 and 42 having flat end faces are fitted into the respective inner and outer ends of the hollow member and sealingly connected thereto for instance by suitable brazing or other pressure holding bonding means, indicated at 43.

Communicating connection between the pressure equalizing pipe 29 and the interior of the pressure chamber units is provided, for instance, axially through the plug member 42. A nipple or other suitable type connection (here not shown) may be provided for establishing the connection between each of the pressure chamber units and the pressure equalizing pipe. Also communicating with the pressure chamber, in a preferred embodiment, are pressure responsive devices indicative of the load conditions imposed upon the drive mechanism. According to this embodiment these devices include a pressure gauge 43 and a limit switch 43a capable of shutting off the motor power in response to excessive fluid pressure in the torque balancing hydraulic pressure system, and/or for actuating suitable alarm devices. In a preferred practical compact arrangement these pressure responsive devices are unitary with the pressure chamber unit, in that they are connected to and carried by a tubular header 44 which in turn through a lateral connection 45 is carried by the plug member 42 through which it communicates as by radial bore 42a (see FIG. 6) with the interior of the pressure chamber.

The pressure chamber unit carrying these fluid pressure responsive devices is shown to be enclosed in a casing member 46 firmly connected to the adjacent end of the worm gear housing as by bolt connections 47, the casing member thus serving as a non-yieldable abutment structure or force containing structure for the enclosed pressure chamber unit.

More particularly, the outer end wall of the casing member 46 provides the non-yielding abutment for the outer end or plug member 42 of the pressure chamber, while the inner end or plug member 41 has thrust transmitting relationship with a thrust bearing unit 48 operatively supporting the inner end of the associated worm shaft member 22. This bearing unit comprises a cup-shaped member or bearing holder 49 axially slideable in the worm gear housing, but secured against rotation as is indicated by a projection provided by screw 50 cooperating with a longitudinal external groove 50a cut into the bearing holder 49 to allow for its sliding movement but not for rotation.

As shown the casing member 46 is longitudinally split into half shells 46a and 46b held firmly together face to face by bolt connections 46c (see FIG. 7).

The bearing holder 49 of the thrust bearing unit contains a combination thrust and radial bearing means in the form of a pair of oppositely arranged conical roller bearings 51 and 52 held in place in the holder by means of a retainer ring 53. A nut 54 engaging the threaded extreme end of the worm shaft member is tightened against the inner bearing races of these rollers bearings, thereby insuring simultaneous axial movement of the worm shaft member and of the cup-shaped bearing holder in the course of torque equalization.

The aforementioned pressure responsive devices in this embodiment are safely located in the casing member 46 with a window 55 provided for the pressure gauge. The pressure responsive switch 43a shown as in the nature of a Bourdon tube device has a pair of contacts 56 and electrical connections 58 with suitable motor control devices here not shown.

For inspection of the torque balancing system of this invention, one need only to loosen the longitudinal bolt connections 47 to separate the casing member 46 from the worm gear housing, and then loosen the transverse bolts 46c to separate the two half shells of the casing member from each other (see FIG. 6), thereby exposing and freeing the pressure chamber unit as it appears in FIG. 7. Thus it will be seen that the hydraulic torque balancing means in the preferred embodiment of the invention presents a self-contained closed system which may be pre-assembled filled with the pressure fluid such as oil, and thus be operatively connected to the respective gear drive units to establish the torque balancing relationship.

Whereas the foregoing embodiment illustrates the invention in a drive mechanism employing one pair of gear drive units, it will be seen that, for instance in the case of larger gear diameters and torque requirements, two pairs of such drive units each pair having an interconnecting floating shaft member, may be embodied in the mechanism. With the two floating shaft members extending parallel to each other, each floating shaft member may be equipped with its own torque imparting drive motor, or a single motor may drive both parallel floating shafts.

However, according to the invention two or more gear drive units including uneven numbers thereof, can readily be accommodated and flexibly arranged, by having each drive unit individually motorized, with provision for starting the motors synchronously.

While such an arrangement is applicable for instance to a bull gear or the like, irrespective of whether it be the internally or the externally toothed type, the schematic example in FIG. 9 shows an internally toothed bull gear 59 and three drive units 60, 61, and 62 located at the respective points of torque application C, D, E, each of which units per se may be substantially similar to the one described above in connection with the embodiment of FIGS. 1 to 8. In this schematic example, a pressure equalizing pipe system 64 interconnects the respective pressure chamber units. Drive torque is imparted to each drive unit by its own individual drive motor 66, which motor, while schematically shown in FIG. 9, is preferably mounted upon the associated worm gear housing which in turn may be supported upon a platform structure, similar to the arrangement described above in the embodiment of FIGS. 1 to 3.

FIG. 10 in schematic form is an example of the invention as applied to an externally toothed gear. Although the previously described drive pinion unit may be employed engaging an externally toothed spur gear, in this example the driven gear itself is in the nature of a worm gear 68 engaged by a plurality of worm shaft members 69 equipped with a torque balancing hydraulic pressure system substantially similar to one described above. A housing structure 70 diagrammatically indicated (in dot-and-dash) accommodates the worm gear and the worm shaft members, while pressure chamber units 71 associated with respective worm shaft members and interconnected by a pressure equalizing pipe system 72 represent the hydraulic torque balancing arrangement. A supporting frame structure 73 carries this drive mechanism with its torque balancing means as well as individual drive motors 74 here shown to impart individual drive power to the respective worm shaft members 69. A shaft 75 or the like connected to the gear is thus rotatable against a torque resistance.

From the foregoing it will be seen that the invention provides a torque balancing system for a plurality of drive gear units in driving engagement with a bull gear or the like, which system is of great simplicity and compactness, and which is readily applicable to any number and arrangement of drive gear units either for internally or for externally toothed driven gears.

With identical pressure chamber units provided for the respective gear drive units, accurate torque equalization is attainable.

Moreover, the self-contained closed hydraulic torque balancing system above described can readily be connected to, or detached from the gear drive units, so that all parts of the system can be readily inspected or replaced.

Also, the worm drive units are readily adaptable or convertible for cooperative connection with the torque balancing system of this invention, inasmuch as this requires no more than providing means for bolting the casing member 46 to the end of the worm gear housing, so that the pressure chamber unit contained in the casing member will be exposed to the thrust reaction of the associated worm shaft member through the thrust bearing unit made axially shiftable but not rotatable in the worm gear housing in the simple manner above described.

Furthermore, the reaction thrust of the worm shaft members may be imparted to the pressure chamber units through additional interposed transmitting means.

Figure 5:
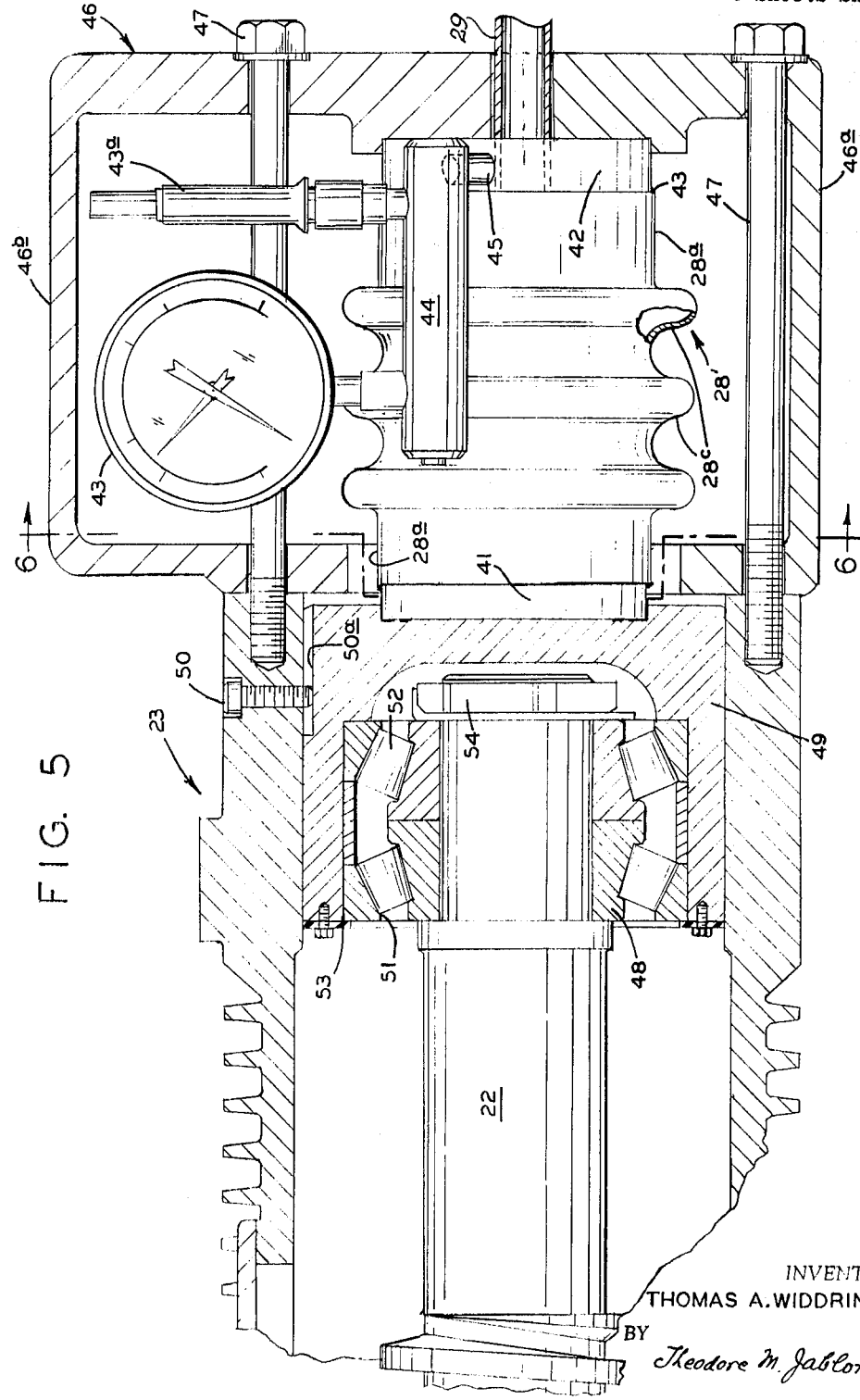
FIG. 5 is a greatly enlarged detail view taken on line 5—5 of FIG. 1 more fully illustrating the construction and arrangement of the torque balancing devices.

Pressure responsive devices such as those above described and designated 43 and 43a in FIG. 5, may be arranged and connected to the hydraulic pressure system in other ways, for example, connected to the pressure equalizing pipe. Closure valve means or the like may be provided allowing the devices to be detached from the system without interruption of the hydraulic equalizing connection between the pressure chamber units, when the closure means is closed. One such arrangement is illustrated schematically in FIG. 11 showing the pressure equalizing pipe 29a interconnecting the pressure chamber units 29b and 29c, the pipe communicating through a closure means or valve 29e with pressure responsive devices 29f. The thrust forces acting upon the free ends of the pressure chambers are indicated by the letter F.

Furthermore, identical sets of fluid pressure responsive devices may be provided with each of the drive units. In addition, closure means may be provided in the pressure equalizing conduit means, enabling the torque balancing connection to be rendered temporarily inoperative with respect to the individual drive units. According to one such arrangement, FIG. 12 shows a closure means or valve 30a provided in the pressure equalizing pipe, and separate sets of pressure responsive devices 30b and 30c one on each side of the closure means and capable of separately indicating load conditions of the respective drive units while the closure means is closed.

It will furthermore be understood that each of the elements described above, or two or more together, may also find a useful application in other types of drive mechanisms differing from types described above.

While the invention has been illustrated and described as embodied in drive mechanism providing a plurality of drive units engaging a single gear, it is not intended to be limited to the details shown, since various modifications and structural changes may be made without departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are to be intended to be comphrended within the meaning and range of equivalence of the following claims.

What is claimed is:

1. A drive mechanism which comprises a base construction, a gear mounted for rotation on said base construction, a plurality of worm drive units mounted on said base construction and arranged to impart positive drive torque to said gear, each drive unit having a housing structure, and a worm shaft member journaled in said housing structure, a plurality of hydraulic pressure chamber units constructed so as to be axially compressible but radially substantially non-yieldable, a plurality of force containing structures for the respective pressure chamber units located at the thrust imparting ends of the respective worm shafts, each containing structure having abutment means engaged by one end of a respective pressure unit, transmitting means for imparting the effects of thrust forces from the respective worm shaft members to the other ends of respective pressure chamber units, fastening means for detachably securing said containing structures in fixed position relative to said housing structures, whereby said transmitting means are maintained in cooperative contact with said other ends of respective pressure chamber units, and pressure equalizing conduit means interconnecting said pressure chamber units and constituting therewith a sealed hydraulic pressure system effective to hydraulically interbalance the thrust forces of said worm shaft members tending to compress the respective pressure chamber units, so that in turn the torque forces applied to said gear by the respective drive units are interbalanced when motor power is applied thereto, said sealed hydraulic pressure system being detachable from said drive units when detaching said fastening means.

2. The drive mechanism according to claim 1, wherein individual motor means are provided for each of said drive units.

3. The drive mechanism according to claim 1, wherein said transmitting means comprise a thrust bearing unit for each worm shaft member, mounted for axial displacement while secured against rotation in the respective housing structure, and wherein said pressure chamber units are arranged coaxial with the respective worm shaft members and in thrust receiving relationship with said thrust bearing units.

4. The drive mechanism according to claim 1, wherein said containing structure comprises a casing surrounding a respective pressure chamber unit, and detachably bolted to said housing structure.

5. The drive mechanism according to claim 1, wherein said containing structure comprises a casing surrounding a respective pressure chamber unit, and detachably bolted to said housing structures, said casing being longitudinally split, with said conduit means located in the plane of the split.

6. The drive mechanism according to claim 1, wherein said transmitting means comprise a thrust bearing for each worm shaft member, mounted for axial displacement while secured against rotation in the respective housing structure, wherein said pressure chamber units are arranged coaxial with the respective worm shaft members and in thrust receiving relationship with said thrust bearing units, wherein said containing structure comprises a casing surrounding a respective pressure chamber unit, and detachably bolted to said housing structure, said casing being longitudinally split with said conduit means located in the plane of said split.

7. The drive mechanism according to claim 1, wherein fluid pressure and torque load responsive devices are provided communicating with said sealed hydraulic pressure systems and detachable unitary therewith.

8. The drive mechanism according to claim 7, wherein said fluid pressure responsive devices comprise a pressure responsive electric switch adapted to provide control impulses or the like in response to torque overload.

9. The drive mechanism according to claim 7, wherein fluid pressure responsive devices comprise a pressure indicator adapted to provide indications of the amount of torque load imposed.

10. A drive mechanism according to claim 7, wherein said pressure chamber unit comprises a hollow body portion of circular cross-section and formed with annular corrugations, cylindrical end portions extending from the body portion, and end closure means in the form of plug members inserted into the respective cylindrical end portions and sealingly connected therewith for containing hydraulic pressure in the unit.

11. The drive mechanism according to claim 10 wherein fluid pressure and torque load responsive devices are provided communicating through one of said plug members with the interior of the pressure chamber unit.

12. The drive mechanism according to claim 10, wherein fluid pressure and torque load responsive devices are provided communicating through one of said plug members with the interior of the pressure chamber unit, and wherein said containing structure is constructed and arranged to provide a casing for said pressure chamber unit and for said devices.

13. The drive mechanism according to claim 1, wherein said transmitting means comprise a thrust bearing unit for each worm shaft member, mounted for axial displacement while secured against rotation in the respective housing structure, and wherein said pressure chamber units are arranged coaxial with the respective worm shaft members in thrust receiving relationship with said thrust bearing units, and wherein fluid pressure responsive devices are provided communicating with said sealed hydraulic pressure system and detachable unitary therewith.

14. A drive mechanism which comprises a base construction, a gear mounted for rotation on said base construction, a worm drive unit mounted on said base construction and arranged to impart drive torque to said gear, and having a housing structure, and a worm shaft member journaled in said housing structure, a pressure chamber unit constructed so as to be axially compressible but radially substantially non-yieldable, fluid pressure and torque load responsive devices communicating with the interior of said pressure chamber unit, a force containing structure for said pressure chamber unit, located at the thrust imparting end of said worm shaft member, and having abutment means engaged by one end of said pressure chamber unit, transmiting means for imparting the effects of thrust forces from said worm shaft member to the other end of said pressure chamber unit, fastening means for detachably securing said containing structure to said housing structure, whereby said transmitting means are maintained in cooperative contact with said other end of said pressure chamber unit, said pressure chamber unit combined with said pressure responsive devices being detachable from said drive unit when detaching said fastening means.

15. The drive mechanism according to claim 14, wherein said transmitting means comprise a thrust bearing unit for said worm shaft member, mounted for axial displacement while secured against rotation in said housing structure, and wherein said pressure chamber unit is arranged coaxial with said worm shaft member and in thrust receiving relationship with said thrust bearing unit.

16. The drive mechanism according to claim 14, wherein said containing structure comprises a casing surrounding said pressure chamber unit, and detachably bolted to said housing structure.

17. The drive mechanism according to claim 14, wherein said transmitting means comprise a thrust bearing unit for said worm shaft member, mounted for axial displacement while secured against rotation in said housing structure, wherein said pressure chamber unit is arranged coaxial with said worm shaft member and in thrust receiving relationship with said thrust bearing unit, and wherein said containing structure comprises a casing surrounding said pressure chamber unit, and detachably bolted to said housing structure.

18. The drive mechanism according to claim 17, wherein said casing is longitudinally split.

19. The drive mechanism according to claim 14, wherein said fluid pressure responsive devices comprise a pressure responsive electric switch adapted to provide control impulses or the like in response to torque overload.

20. The drive mechanism according to claim 14, wherein said fluid pressure responsive devices comprise a pressure indicator adapted to provide indications of the amount of torque load imposed.

21. A drive mechanism according to claim 14, wherein said pressure chamber unit comprises a hollow body portion of circular cross-section and is formed with annular corrugations, cylindrical end portions, and end closure means in the form of plug members inserted into the respective cylindrical end portions and sealingly connected therewith for containing hydraulic pressure in the unit, and wherein said fluid pressure responsive devices have communicating connection with the interior of said pressure chamber unit through one of said plug members.

22. The drive mechanism according to claim 21, wherein said containing structure comprises a casing bolted to said housing structure, for both said pressure chamber unit and for said pressure responsive devices.

References Cited by the Examiner

UNITED STATES PATENTS

| | | | |
|---|---|---|---|
| 862,867 | 8/1907 | Eggleston | 230—170 X |
| 1,458,131 | 6/1923 | Davis | 74—410 |
| 2,143,921 | 1/1939 | Lewis | 74—427 |
| 2,218,990 | 10/1940 | Kuhns et al. | 74—410 |
| 2,235,501 | 3/1941 | Kuhns | 74—410 |
| 2,931,241 | 4/1960 | Scott | 74—410 |

DON A. WAITE, *Primary Examiner.*

JAMES A. WONG, *Examiner.*